United States Patent
Springberg

(10) Patent No.: US 11,068,365 B2
(45) Date of Patent: Jul. 20, 2021

(54) DATA RECOVERY WITHIN A MEMORY SUB-SYSTEM WITHOUT MOVING OR PROCESSING THE DATA THROUGH A HOST

(71) Applicant: Micron Technology, Inc., Boise, ID (US)

(72) Inventor: David G. Springberg, Fort Collins, CO (US)

(73) Assignee: Micron Technology, Inc., Boise, ID (US)

(*) Notice: Subject to any disclaimer, the term of this patent is extended or adjusted under 35 U.S.C. 154(b) by 191 days.

(21) Appl. No.: 16/110,881

(22) Filed: Aug. 23, 2018

(65) Prior Publication Data
US 2020/0065204 A1 Feb. 27, 2020

(51) Int. Cl.
*G06F 11/20* (2006.01)
*G06F 3/06* (2006.01)

(52) U.S. Cl.
CPC ........ *G06F 11/2094* (2013.01); *G06F 3/0646* (2013.01); *G06F 11/2053* (2013.01); *G06F 2201/805* (2013.01); *G06F 2201/82* (2013.01)

(58) Field of Classification Search
CPC ...... G06F 3/0605; G06F 3/064; G06F 3/0646; G06F 3/0647; G06F 3/065; G06F 11/1076; G06F 11/2053; G06F 11/2094
See application file for complete search history.

(56) References Cited

U.S. PATENT DOCUMENTS

| | | | | |
|---|---|---|---|---|
| 5,499,337 A * | 3/1996 | Gordon | ............... | G06F 11/1008 714/11 |
| 6,151,641 A * | 11/2000 | Herbert | ................. | G06F 3/0607 710/22 |
| 6,640,278 B1 * | 10/2003 | Nolan | ................... | G06F 3/0601 707/999.001 |
| 7,146,387 B1 * | 12/2006 | Russo | ................. | G06F 11/1469 |
| 2002/0169996 A1 | 11/2002 | King et al. | | |
| 2003/0167439 A1 * | 9/2003 | Talagala | ............... | G06F 11/1076 714/770 |

(Continued)

FOREIGN PATENT DOCUMENTS

| KR | 1020150145511 A | 12/2015 |
|---|---|---|
| KR | 1020170124673 A | 11/2017 |

OTHER PUBLICATIONS

Wikipedia's Processor Register historical version published Jul. 29, 2019 https://en.wikipedia.org/w/index.php?title=Processor_register&oldid=908396551 (Year: 2019).*

(Continued)

*Primary Examiner* — Joseph O Schell
(74) *Attorney, Agent, or Firm* — Brooks, Cameron & Huebsch, PLLC

(57) ABSTRACT

A command to transfer data in a portion of a memory component to a recovery portion of a different memory component is received from a host system, wherein the portion of the memory component is associated with a portion of the memory component that has failed, and the data in the portion of the memory component is recovered and transferred to the recovery portion of the different memory component without moving or processing the data through the host system responsive to receipt of the command.

18 Claims, 4 Drawing Sheets

(56) References Cited

U.S. PATENT DOCUMENTS

| | | | |
|---|---|---|---|
| 2004/0250019 A1* | 12/2004 | Fujie | G06F 11/1076 |
| | | | 711/114 |
| 2005/0114593 A1* | 5/2005 | Cassell | G06F 3/0689 |
| | | | 711/114 |
| 2006/0167838 A1* | 7/2006 | Lacapra | G06F 16/1824 |
| 2007/0101058 A1* | 5/2007 | Kinnan | G06F 3/0629 |
| | | | 711/114 |
| 2009/0089612 A1* | 4/2009 | Mathew | G06F 11/1076 |
| | | | 714/6.2 |
| 2011/0185122 A1* | 7/2011 | Choi | G06F 11/1076 |
| | | | 711/114 |
| 2012/0089867 A1* | 4/2012 | Bartlett | G06F 11/2094 |
| | | | 714/6.22 |
| 2016/0050146 A1* | 2/2016 | Henderson | H04L 67/1097 |
| | | | 370/392 |
| 2017/0177476 A1* | 6/2017 | Goren | G06F 3/0673 |
| 2017/0212814 A1 | 7/2017 | Hands | |
| 2017/0242752 A1 | 8/2017 | Lee | |
| 2017/0315879 A1 | 11/2017 | Park et al. | |
| 2019/0087268 A1* | 3/2019 | Koltsidas | G06F 3/0689 |

OTHER PUBLICATIONS

HGST, Inc., "HGST Delivers Rebuild Assist Mode for Faster RAID Recovery", 2014, (4 pgs.), HGST White Paper.
Petersen, Chris, "Introducing Lightning: A Flexible NVMe JBOF", published Mar. 9, 2016, (4 pgs.), retrieved from https://code.fb.com/data-center-engineering/introducing-lightning-a-flexible-nvme-jbof/.
International Search Report and Written Opinion from international application No. PCT/US2019/047465, dated Dec. 6, 2019, 13 pages.

* cited by examiner

DATA RECOVERY WITHIN A MEMORY SUB-SYSTEM WITHOUT MOVING OR PROCESSING THE DATA THROUGH A HOST

TECHNICAL FIELD

The present disclosure relates generally to a memory sub-system, and more specifically, to data recovery within a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
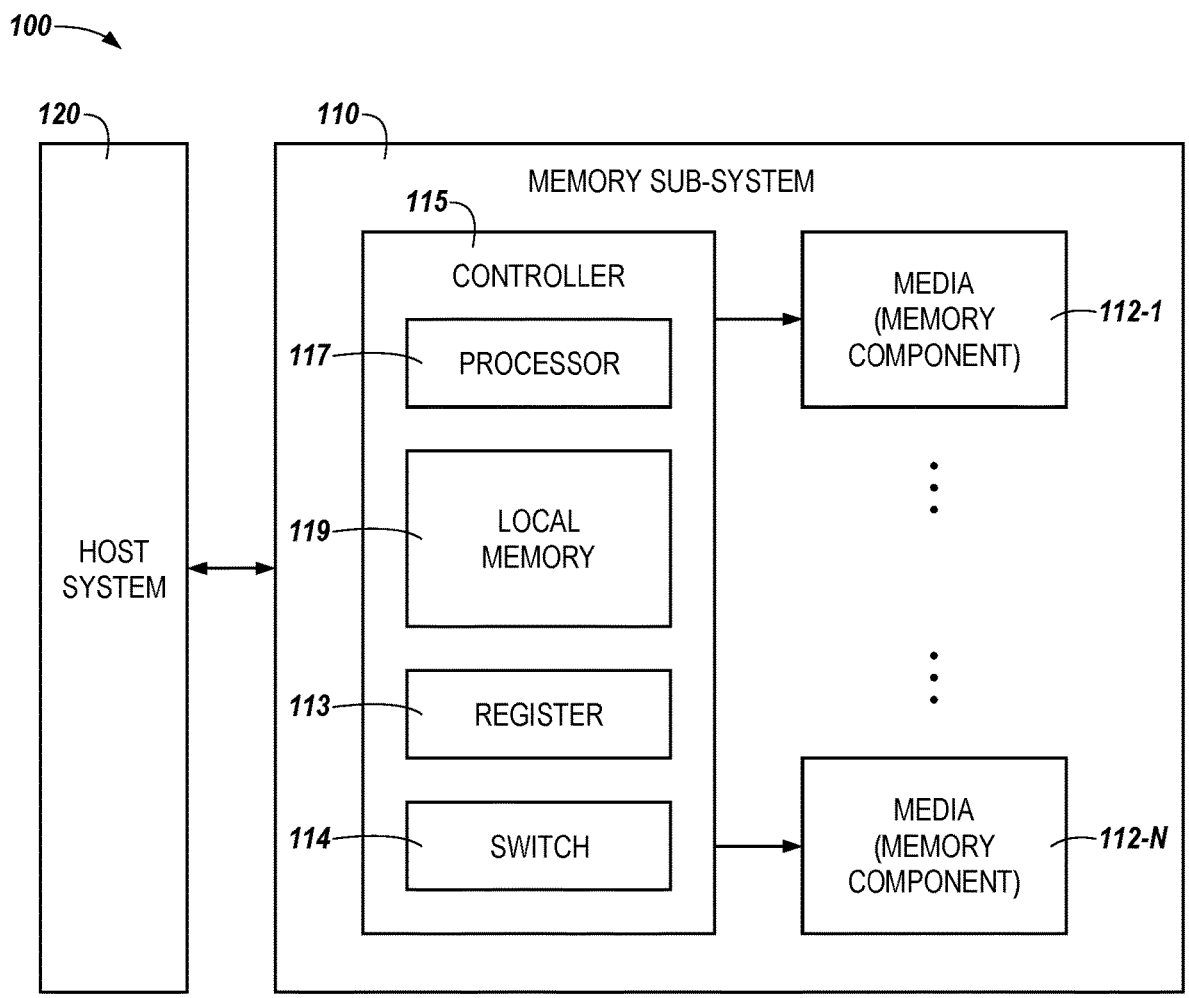
FIG. 1 illustrates an example computing environment that includes a memory sub-system in accordance with some embodiments of the present disclosure.

Aspects of the present disclosure are directed to data recovery within a memory sub-system. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

During operation of a memory sub-system (e.g., storage system), a number of defects and/or errors may occur. Such defects and/or errors can cause the data stored in the memory sub-system to be lost, which can result in a failure of the memory sub-system. Memory sub-systems can protect against data loss using a variety of different data protection and/or recovery schemes, such as, for example, a redundant array of independent disks (RAID) data protection and recovery scheme, which can divide and/or replicate the data stored in the memory sub-systems among multiple memory devices. For instance, a RAID data protection and recovery scheme can divide and/or replicate the data stored in the memory sub-systems across a stripe of memory devices, and subsequently recover lost data using the data in the stripe.

A conventional data recovery scheme, such as a conventional RAID scheme, is managed and performed at the host system level. For example, in a conventional RAID data recovery, the data being recovered (e.g., the data being moved from a failing device to a healthy device) must be processed and then moved through the host system. However, processing and moving the data by the host system can increase (e.g., extend) the amount of time needed to recover the data, which can adversely affect the performance of the host system and/or memory sub-system. Further, a second (e.g., additional) failure can occur during this extended data recovery process, which can be catastrophic for the memory sub-system.

Aspects of the present disclosure address the above and other deficiencies by performing data recovery within the memory sub-system. For example, aspects of the present disclosure do not process or move the data being recovered through the host system. Rather, the data being recovered can be processed and moved directly between the devices of the memory sub-system, which can decrease the amount of time needed to recover the data (e.g., increase the efficiency of the data processing and movement) as compared to conventional approaches (e.g., conventional RAID data recovery schemes in which the recovered data is moved and processed by the host system).

Further, aspects of the present disclosure can process and move the data being recovered throughout the memory sub-system in parallel, which can further decrease (e.g., accelerate) the data recovery time. Further, aspects of the present disclosure can leverage any data of the memory sub-system that has not been lost (e.g., "good" data) to further decrease the data recovery time.

As such, aspects of the present disclosure can increase the performance of the host system and/or memory sub-system as compared to conventional approaches. Further, aspects of the present disclosure can utilize the existing components and/or elements of the memory sub-system, such as, for instance, the existing processing and/or memory power of the memory sub-system, and/or existing RAID functionality. Further, aspects of the present disclosure can reduce the cost and/or power consumption of the overall system by using the processing power of the memory sub-system, such that the host does not have to use processing power for the data recovery. Further, aspects of the present disclosure can be utilized for both full and partial data loss (e.g., both full and partial failures) that occur in the memory sub-system.

FIG. 1 illustrates an example computing environment 100 that includes a memory sub-system 110 in accordance with some embodiments of the present disclosure. The memory sub-system 110 can include media, such as memory components 112-1 to 112-N. The memory components 112-1 to 112-N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative-and (NAND) type flash memory. Each of the memory components 112-1 to 112-N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112-1 to 112-N can be grouped as memory pages or data blocks that can refer to a unit of the memory component used to store data.

The memory system controller 115 (hereinafter referred to as "controller") can communicate with the memory components 112-1 to 112-N to perform operations such as reading data, writing data, or erasing data at the memory components 112-1 to 112-N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system into command instructions to access the memory components 112-1 to 112-N as well as convert responses associated with the memory components 112-1 to 112-N into information for the host system 120.

The memory sub-system 110 includes a register 113 and a switch 114 that can be used by memory sub-system 110 to perform data recovery within memory sub-system 110. In some embodiments, the controller 115 includes at least a portion of register 113 and/or switch 114. For example, controller 115 can include a processor 117 (processing device) configured to execute instructions stored in local memory 119 for performing the operations described herein. For instance, processor 117 can execute instructions stored in local memory 119 to perform data recovery operations within memory sub-system 110, with an optional hardware assist.

Register 113 and switch 114 can be used by memory sub-system 110 to perform data recovery without moving or processing the data being recovered through the host system 120. For example, register 113 and switch 114 can be used by memory sub-system 110 to process and move the data being recovered directly between the devices of the memory sub-system. Register 113 can be, for example, a base address register, and switch 114 can be, for example, a PCIe switch. Further details with regards to the operations of register 113 and switch 114 are described below.

For example, memory sub-system 110 (e.g., controller 115), can receive, from host system 120, a command (e.g., a read command) to transfer data in a portion of a memory component 112-1, . . . , 112-N to a recovery portion of a different memory component 112-1, . . . , 112-N. The portion of the memory component 112-1, . . . , 112-N can be, for example, a RAID stripe of the memory component, and can be associated with (e.g., cover the logical block addresses of) a portion of the memory component 112-1, . . . , 112-N that has failed. The recovery portion can be one of multiple recovery portions of the different memory component, as will be further described herein.

RAID, as used herein, is an umbrella term for computer information (e.g., data) storage schemes that divide and/or replicate (e.g., mirror) information among multiple pages of multiple memory devices and/or components, for instance, in order to help protect the data stored therein. The multiple memory devices and/or components in a RAID array may appear to a user and the operating system of a computer as a single memory device (e.g., disk). RAID can include striping (e.g., splitting) information so that different portions of the information are stored on different pages of different memory devices and/or components. The portions of the more than one device or component that store the split data are collectively referred to as a stripe. In contrast, RAID can also include mirroring, which can include storing duplicate copies of data on more than one page of more than one device or component. As an example of the former, write data can be striped across N−1 of N memory devices and/or components, where error information can be stored in an Nth memory device or component. A RAID stripe can include (e.g., be a combination of) user data and parity data. The parity data of the RAID stripe can include error protection data that can be used to protect user data stored in the memory against defects and/or errors that may occur during operation of the memory. For example, the RAID stripe can protect user data stored in the memory against defects and/or errors that may occur during operation of the memory, and can therefore provide protection against a failure of the memory.

As used herein, a portion of a memory component that has failed can refer to and/or include a portion of the memory component whose data has been lost. For example, the portion of the memory component that has failed can include one or more arrays, pages, and/or blocks of data that have been lost. In some examples, the portion of the memory component 112-1, . . . , 112-N that has failed can comprise less than all of the memory component (e.g., not all data stored in the memory component has been lost). Such an example can be referred to as a partial failure of the memory component. In some examples, the portion of the memory component 112-1, . . . , 112-N that has failed can comprise all of the memory component (e.g., all data stored in the memory component has been lost). Such an example can be referred to as a full failure of the memory component.

In some examples (e.g., in a partial failure example), memory sub-system 110 can send a notification of the failure of the portion of the memory component 112-1, . . . , 112-N to host system 120. For example, memory sub-system 110 can notify host system 120 of the logical block addresses (LBAs) associated with the data that has been lost. These LBAs can include multiple ranges of LBAs. In some examples (e.g., in a full failure example), host system 120 can detect the failure of the portion of the memory component 112-1, . . . , 112-N because, for instance, the entire component has gone offline.

Upon receiving the notification of the failure, or upon detecting the failure, of the portion of the memory component 112-1, . . . , 112-N, host system 120 can determine (e.g. identify) the location of the RAID stripe associated with that memory component and the location of the recovery portion of the different memory component. Host system 120 can then send the command to memory sub-system 110 to transfer the data in that RAID stripe to the recovery portion, with the command including an identification of (e.g., an identification of the location of) the RAID stripe and recovery portion of the different memory component. After sending the command, host system 120 can operate in a reduced operation mode, such as, for instance, a degraded read mode, until the lost data has been recovered. For instance, the lost data may be unmapped, with reads resulting in zeros, until the data recovery is complete.

Further, upon receiving the notification of the failure, or upon detecting the failure, of the portion of the memory component 112-1, . . . , 112-N, host system 120 can define an address range (e.g., an LBA range) that is outside an existing address range associated with the memory component. The existing address range can be, for example, the address range used by host system 120 to access the memory component (e.g., to access the data stored by the memory component) during normal operation. That is, the defined address range can be outside the normal LBA range used by host system 120 to access the memory component during normal operation, in order to prevent host system 120 from accessing the data until it has been fully recovered.

Host system 120 can then send the defined address range to memory sub-system 110. Upon receiving the defined address range from host system 120, memory sub-system 110 can store the address range in register 113 for use in performing data recovery within memory sub-system 110, as will be further described herein.

Memory sub-system 110 can, responsive to receiving from host system 120 the command to transfer the data in the portion (e.g., RAID stripe) of the memory component 112-1, . . . , 112-N to the recovery portion of the different memory component 112-1, . . . , 112-N, recover and transfer the data to the recovery portion without moving or processing the data through the host system 120. For example, memory sub-system 110 can recover and transfer the data directly from the RAID stripe of the memory component to the recovery portion of the different memory component.

Memory sub-system 110 can recover and transfer the data in the portion of the memory component 112-1, . . . , 112-N to the recovery portion of the different memory component without moving or processing the data through host system 120 by, for example, recovering and transferring the data using the defined address range (e.g., the address range outside the existing address range associated with the memory component) received from host system 120 and stored in register 113. For instance, an address (e.g., LBA) within the defined address range can provide an indication to memory sub-system 110 that the data is being accessed as part of a data recovery operation (e.g., and not as part of a normal host access operation). Accordingly, an accessing of the data using an address within the defined address range can provide an indication to memory sub-system 110 that the data is to be recovered and transferred within memory sub-system 110 (e.g., directly to the recovery portion of the different memory component), rather than to the host system 120. For instance, memory sub-system 110 can know to recover and transfer the data in the RAID stripe to the recovery portion of the different memory component, and not to host system 120, because the RAID stripe is being accessed using an address in register 113 (e.g., an address that is outside the range for a normal host access).

Further, memory sub-system 110 can recover and transfer the data in the portion of the memory component 112-1, . . . , 112-N to the recovery portion of the different memory component 112-1, . . . , 112-N without moving or processing the data through host system 120 by, for example, recovering and transferring the data using (e.g., through) switch 114. For instance, switch 114 can receive the data from the RAID stripe, and direct the data to the recovery portion using the address in the defined range in register 113.

The recovery and transfer of the data in the RAID stripe of the memory component 112-1, . . . , 112-N to the recovery portion of the different memory component can include the performance of an XOR operation on the data in the RAID stripe to recover the data of the memory component that has been lost. The parameters of the XOR operation (e.g., stripe length, RAID ratio, etc.) may be defined by host system 120.

In examples in which the portion of the memory component 112-1, . . . , 112-N that has failed comprises less than all of that memory component, the data stored in the remaining portion of the memory component that has not failed (e.g., the "good" data that has not been lost) can be moved to a different portion of the different memory component as part of the recovery process without moving or processing the data through host system 120. That is, the remaining "good" data can be leveraged as part of the recovery process.

For example, host 120 can determine (e.g. identify) the portion of the memory component to which the "good" data is to be moved. This portion of the memory component can be, for instance, the recovery portion of the different memory component 112-1, . . . , 112-N to which the RAID stripe data is transferred, or can be a different portion (e.g., a different recovery portion) of the different memory component. Host system 120 can then send a command to memory sub-system 110 to transfer the "good" data to that portion of the memory component, with the command including an identification of (e.g., an identification of the location of) that portion.

Memory sub-system 110 can, responsive to receiving from host system 120 the command to transfer the good data of the memory component, transfer the good data to the portion of the different memory component so identified in the command without moving or processing the data through the host system 120. For example, memory sub-system 110 can transfer the good data directly to the identified portion of the different memory component in a manner analogous to that previously described for the data in the RAID stripe of the memory component (e.g., using switch 114 and the defined address range stored in register 113). Further, memory sub-system 110 can transfer the good data to the identified portion of the different memory component while recovering and transferring (e.g., in parallel with) the RAID stripe data to the recovery portion.

In examples in which the different memory component 112-1, . . . , 112-N includes multiple recovery portions, multiple data recovery operations can be performed in parallel, such that the data being recovered in each respective operation can be moved to their respective recovery portions in parallel. For example, if an additional portion of the memory component 112-1, . . . , 112-N has failed, memory sub-system 110 can receive, from host system 120, an additional command to transfer data in an additional RAID stripe of the memory component 112-1, . . . , 112-N associated with that additional failed portion to an additional recovery portion of the different memory component, in a manner analogous to the command received to transfer the data in the RAID stripe to the recovery portion as previously described herein. Memory sub-system 110 can, responsive to receiving the additional command, and while recovering and transferring (e.g., in parallel with) the data in the previously described RAID stripe to the previously described recovery portion, recover and transfer the data in the additional RAID stripe to the additional recovery portion without moving or processing the data through the host system 120 in a manner analogous to the data recovery and transfer as previously described herein (e.g., using switch 114 and register 113).

After the data in the RAID stripe of memory component 112-1, . . . , 112-N has been recovered and transferred to the recovery portion of the different memory component, memory sub-system 110 can change (e.g., move and/or update) the address (e.g., LBA) associated with the transferred data to an address within the existing address range associated with the different memory component (e.g., within the address range used by host system 120 to access the different memory component during normal operation). For example, the address can be changed to the original address of the data that was lost. Further, after the data in the RAID stripe of memory component 112-1, . . . , 112-N has been recovered and transferred to the recovery portion of the different memory component, memory sub-system 110 can send a notification to host system 120 to indicate that the data recovery is complete.

Figure 2:
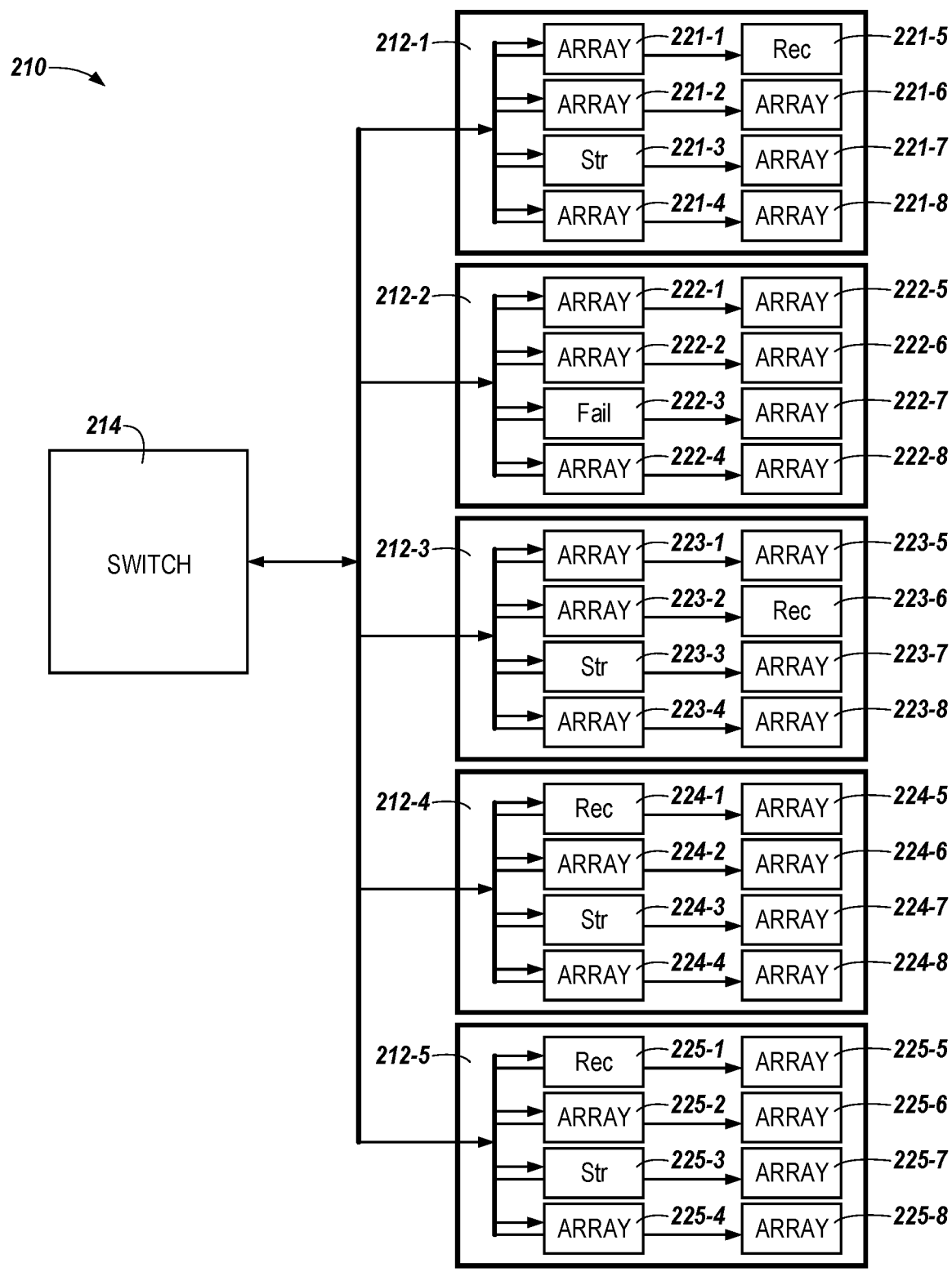
FIG. 2 illustrates an example memory sub-system in accordance with some embodiments of the present disclosure.

FIG. 2 illustrates an example memory sub-system 210 in accordance with some embodiments of the present disclosure. Memory sub-system 210 can be, for example, memory sub-system 110 previously described in connection with FIG. 1.

As shown in FIG. 2, memory sub-system 210 can include memory components 212-1 to 212-5, and switch 214 operatively coupled to memory components 212-1 to 212-5. Memory components 212-1 to 212-5 and switch 214 can be, for example, memory components 112-1, . . . , 112-N and switch 114, respectively, previously described in connection with FIG. 1. As an example, switch 214 can be a PCIe switch included on a PCIe expansion board that is coupled to a PCIe drive plane board on which memory components 212-1 to 212-5 are located. Further, although five memory components are included in the embodiment illustrated in FIG. 2, embodiments of the present disclosure are not limited to a particular number of memory components.

As shown in FIG. 2, and as previously described in connection with FIG. 1, each respective memory component 212-1, . . . , 212-5 can include arrays of memory cells. For instance, memory component 212-1 can include arrays 221-1 to 221-8, memory component 212-2 can include arrays 222-1 to 222-8, memory component 212-3 can include arrays 223-1 to 223-8, etc. Although eight arrays are included in each respective memory component in the embodiment illustrated in FIG. 2, embodiments of the present disclosure are not limited to a particular number of arrays per memory component. Further, as an example, each respective array can store four terabytes (TB) of data. However, embodiments of the present disclosure are not so limited.

In the example illustrated in FIG. 2, a RAID stripe is stored across portions of arrays 221-3, 223-3, 224-3, and 225-3 of memory components 212-1, 212-3, 212-4, and 212-5, respectively. For instance, the RAID stripe can be stored across multiple pages of each respective array 221-3, 223-3, 224-3, and 225-3.

In the example illustrated in FIG. 2, portions of arrays 221-5, 223-6, 224-1, and 225-1 of memory components 212-1, 212-3, 212-4, and 212-5, respectively, have been designated (e.g., by host system 120 previously described in connection with FIG. 1) as recovery portions. For instance, the recovery portions of each respective array 221-5, 223-6, 224-1, and 225-1 can include one or more pages and/or blocks of memory cells within that respective array. The portions of the arrays designated as recovery portions may change during operation of memory sub-system 210, or may remain the same (e.g., fixed) throughout operation of memory sub-system 210. Further, the greater the number of portions that are designated as recovery portions, the greater the number of recovery operations that can be performed in parallel. Although portions of four different arrays have been designated as recovery portions in the embodiment illustrated in FIG. 2, embodiments of the present disclosure are not so limited.

In the example illustrated in FIG. 2, a portion of array 222-3 of memory component 212, such as, for instance, one or more pages and/or blocks of memory cells of array 222-3, has failed. Accordingly, the data in the RAID stripe stored across arrays 221-3, 222-3, 224-3, and 225-3 that is associated with (e.g. covers the LBAs of) the portion of array 222-3 that has failed can be recovered and transferred to one of the recovery portions of arrays 221-5, 223-6, 224-1, and 225-1, as previously described in connection with FIG. 1. For instance, the data can be recovered and transferred to the recovery portion using (e.g. through) switch 214, as previously described in connection with FIG. 1.

Figure 3:
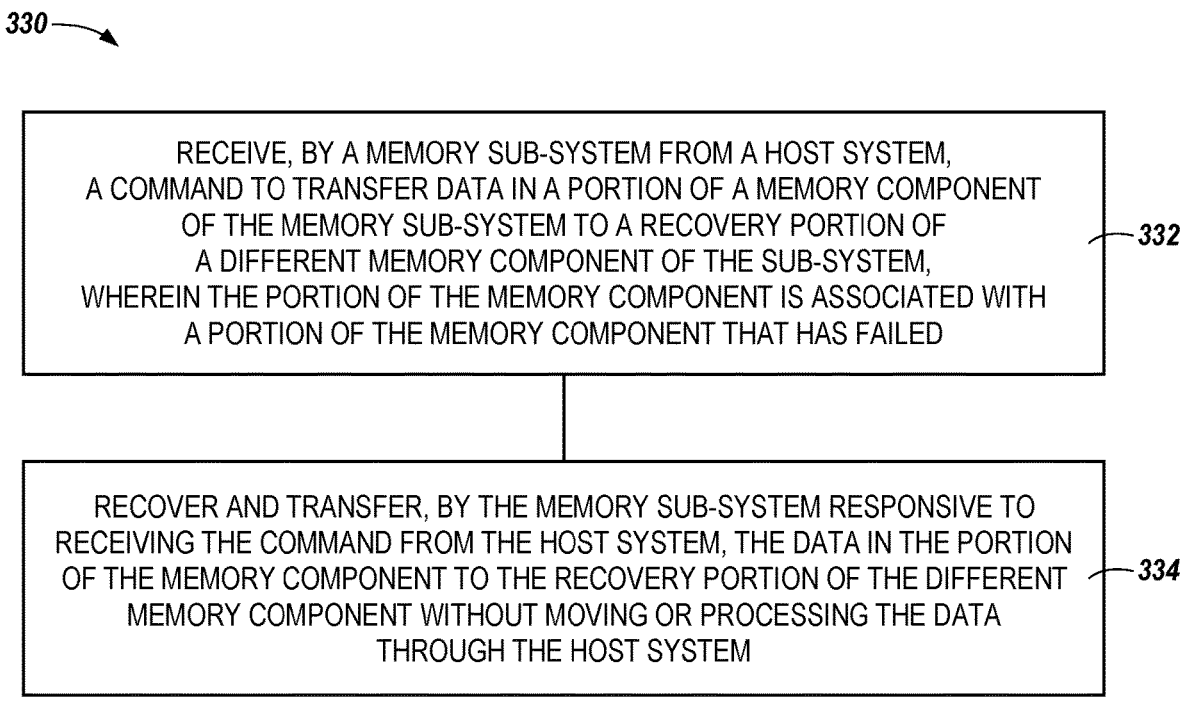
FIG. 3 is a flow diagram of an example method to perform data recovery within a memory sub-system in accordance with some embodiments of the present disclosure.

FIG. 3 is a flow diagram of an example method 330 to perform data recovery within a memory sub-system in accordance with some embodiments of the present disclosure. The method 330 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 330 is performed by the controller 115 of the memory sub-system 110 of FIG. 1, using the register 113 and switch 114 of the memory sub-system 110. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 332, the memory sub-system receives, from a host system, a command to transfer data in a portion of a memory component of the memory sub-system to a recovery portion of a different memory component of the memory subsystem, wherein the portion of the memory component is associated with a portion of the memory component that has failed. The portion of the memory component can be, for example, a RAID stripe, as previously described in connection with FIG. 1. The host system can be, for example, host system 120 previously described in connection with FIG. 1, and the command received from the host system can be analogous to that previously described in connection with FIG. 1. Further, the memory component can be, for example, memory component 112-1, . . . , 112-N previously described in connection with FIG. 1, and the recovery portion and the failed portion of the memory component can be analogous to those previously described in connection with FIG. 1.

At block 334, the memory sub-system recovers and transfers, responsive to receiving the command from the host system, the data in the portion of the memory component to the recovery portion of the different memory component without moving or processing the data through the host system. The data can be recovered and transferred to the recovery portion without moving or processing the data through the host system in a manner analogous to that previously described in connection with FIG. 1. For example, the data can be recovered and transferred to the recovery portion without moving or processing the data through the host system by using register 113 and switch 114, as previously described in connection with FIG. 1.

Figure 4:
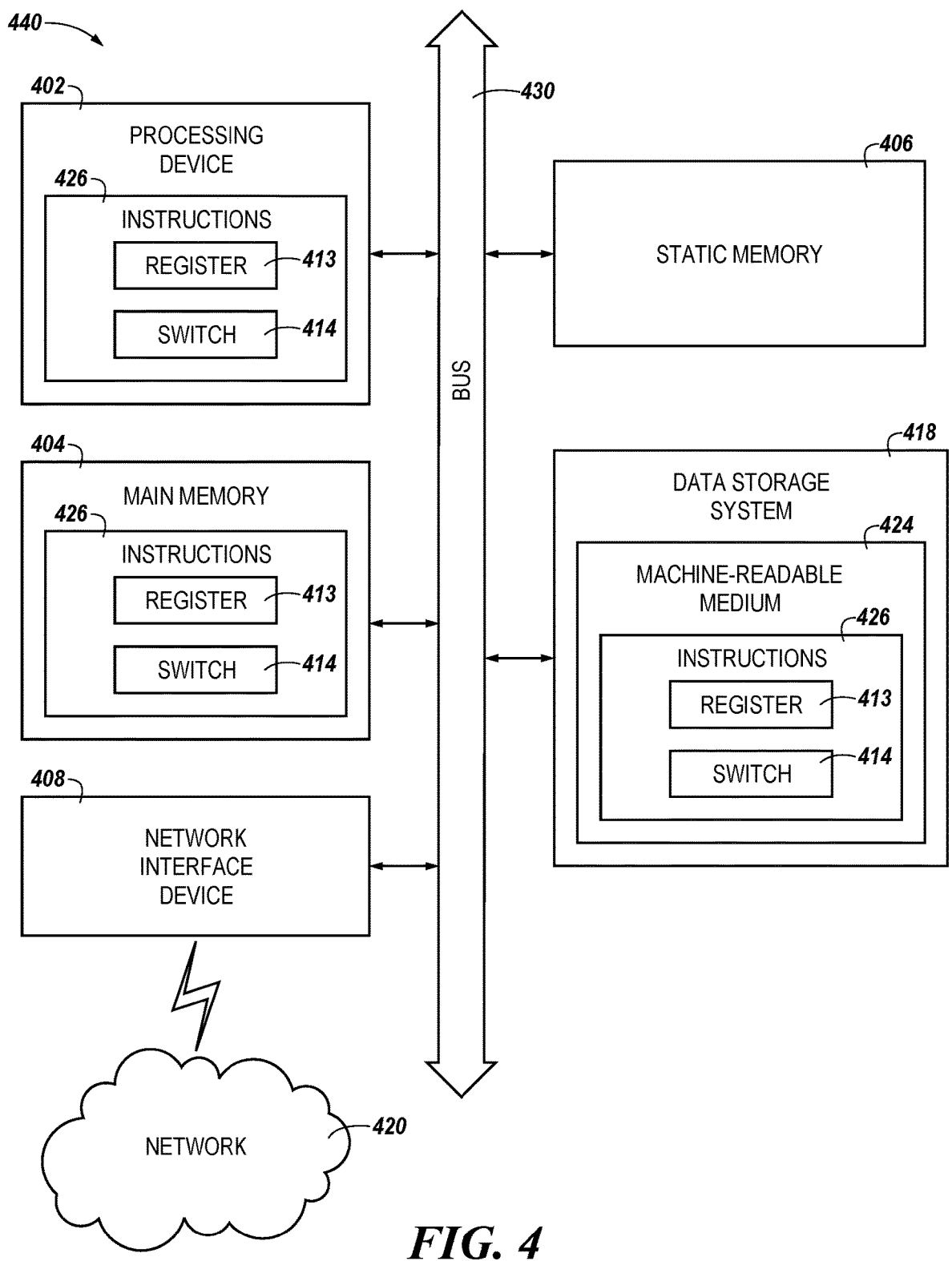
FIG. 4 is a block diagram of an example computer system in which embodiments of the present disclosure may operate.

FIG. 4 illustrates an example machine of a computer system 440 within which a set of instructions, for causing the machine to perform any one or more of the methodologies discussed herein, can be executed. In some embodiments, the computer system 440 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the controller 115 of FIG. 1, including the register 113 and switch 114 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 440 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 440 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 440, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to register 413 and switch 414, which may correspond to register 113 and switch 114, respectively, of FIG. 1. While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a", "an", or "a number of" can refer to one or more of something, and "a plurality of" can refer to one or more such things. For example, a memory device can refer to one or more memory devices, and a plurality of memory devices can refer to two or more memory devices. Additionally, the designator "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A system, comprising:
a memory component of a memory sub-system;
a register to store an address range that is outside of an existing address range associated with the memory component, wherein the existing address range associated with the memory component comprises an address range used by a host system to access the memory component; and
a processing device, operatively coupled with the memory component, to:
receive, from the host system, a command to transfer data in a portion of the memory component to a recovery portion of a different memory component within the memory sub-system, wherein the portion of the memory component is associated with a portion of the memory component that has failed; and recover and transfer, responsive to receipt of the command, the data in the portion of the memory component to the recovery portion of the different memory component without moving or processing the data through the host system by using an address within the address range that is outside of the existing address range associated with the memory component, wherein the address provides an indication that the data is to be recovered and transferred to the recovery portion of the different memory component within the memory sub-system.

2. The system of claim 1, wherein the portion of the memory component is a redundant array of independent disks (RAID) stripe.

3. The system of claim 1, wherein the processing device is to:
receive, from the host system, a command to transfer data in a portion of the memory component that has not failed; and
transfer, responsive to receipt of the command, the data in the portion of the memory component that has not failed to the recovery portion of the different memory component without moving or processing the data through the host system.

4. The system of claim 1, wherein the processing device is to:
receive, from the host system, an additional command to transfer data in an additional portion of the memory component to an additional recovery portion of the different memory component, wherein the additional portion of the memory component is associated with an additional portion of the memory component that has failed; and
recover and transfer, responsive to receipt of the additional command and while recovering and transferring the data in the portion of the memory component to the recovery portion of the different memory component, the data in the additional portion of the memory component to the additional recovery portion of the different memory component without moving or processing the data through the host system.

5. The system of claim 1, further comprising a switch operatively coupled with the memory component and the different memory component, and wherein the processing device is to recover and transfer the data in the portion of the memory component to the recovery portion of the different memory component using the switch.

6. The system of claim 1, wherein the processing device is to send, to the host system, a notification of the failure of the portion of the memory component that has failed.

7. A method, comprising:
receiving, by a memory sub-system from a host system, a command to transfer data in a portion of a memory component of the memory sub-system to a recovery portion of a different memory component of the memory sub-system, wherein the portion of the memory component is associated with a portion of the memory component that has failed; and
recovering and transferring, by the memory sub-system responsive to receiving the command from the host system, the data in the portion of the memory component to the recovery portion of the different memory component without moving or processing the data through the host system by using an address within an address range that is outside of an existing address range associated with the memory component, wherein the existing address range associated with the memory component comprises an address range used by the host system to access the memory component and the address provides an indication that the data is to be recovered and transferred to the recovery portion of the different memory component within the memory sub-system.

8. The method of claim 7, wherein recovering and transferring the data in the portion of the memory component to the recovery portion of the different memory component comprises performing an XOR operation on the data.

9. The method of claim 7, further comprising recovering and transferring the data in the portion of the memory component to the recovery portion of the different memory component using a switch of the memory sub-system.

10. The method of claim 7, wherein the portion of the memory component that has failed comprises all of the memory component.

11. The method of claim 7, wherein the portion of the memory component that has failed comprises less than all of the memory component.

12. The method of claim 7, further comprising sending a notification to the host system after recovering and transferring the data in the portion of the memory component to the recovery portion of the different memory component.

13. The method of claim 7, further comprising:
receiving, by the memory sub-system from the host system, a command to transfer data in a portion of the memory component that has not failed; and
recovering and transferring, by the memory sub-system responsive to receipt of the command and while recovering and transferring the data in the portion of the memory component to the recovery portion of the different memory component, the data in the portion of the memory component that has not failed to an additional recovery portion of the different memory component without moving or processing the data through the host system.

14. A non-transitory computer-readable storage medium comprising instructions that, when executed by a processing device, cause the processing device to:
receive, from a host system, an address range that is outside of an existing address range associated with a memory component, wherein the existing address range associated with the memory component comprises an address range used by the host system to access the memory component;
receive, from the host system, a command to transfer data in a redundant array of independent disks (RAID) stripe of the memory component to a recovery portion of the memory component, wherein the RAID stripe is associated with a portion of the memory component that has failed; and
recover and transfer, responsive to receipt of the command, the data in the RAID stripe of the memory component to the recovery portion of the memory component using an address within the received address range that is outside of the existing address range associated with the memory component, wherein the address provides an indication that the data is to be recovered and transferred to the recovery portion of the memory component within the memory component, such that the data is recovered and transferred without moving or processing the data through the host system.

15. The non-transitory computer-readable storage medium of claim 14, wherein the processing device is further caused to store the received address range in a register.

16. The non-transitory computer-readable storage medium of claim 14, wherein the processing device is further caused to:
   change, after recovering and transferring the data in the RAID stripe of the memory component to the recovery portion of the memory component, an address associated with the recovered and transferred data to an address within the existing address range associated with the memory component.

17. The non-transitory computer-readable medium of claim 14, wherein the recovery portion of the memory component comprises one of a plurality of recovery portions of the memory component.

18. The non-transitory computer-readable medium of claim 14, wherein the command from the host system comprises:
   an identification of the RAID stripe of the memory component; and
   an identification of the recovery portion of the memory component.

* * * * *